W. E. MARCHANT.
SPEED LIMITING DEVICE FOR MOTOR VEHICLES.
APPLICATION FILED AUG. 29, 1910.

994,415.

Patented June 6, 1911.

2 SHEETS—SHEET 1.

Witnesses
A. M. Dorr.
C. R. Stickney

Inventor
William E. Marchant
By
Attorneys

W. E. MARCHANT.
SPEED LIMITING DEVICE FOR MOTOR VEHICLES.
APPLICATION FILED AUG. 29, 1910.
994,415.
Patented June 6, 1911.
2 SHEETS—SHEET 2.
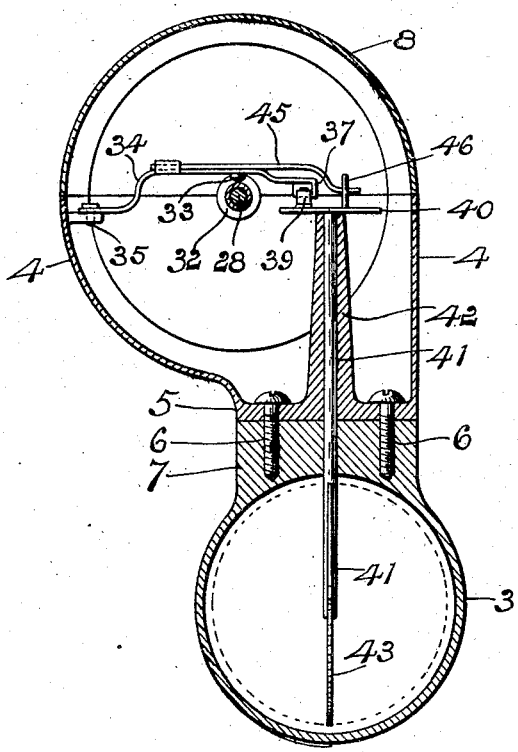
Fig. 3
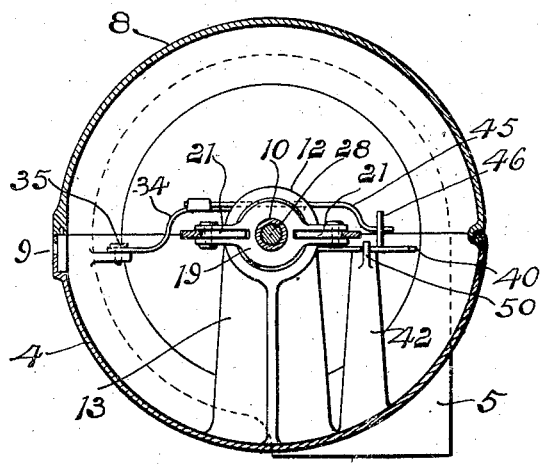
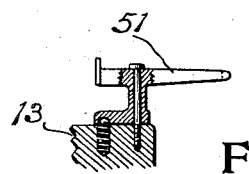
Fig. 4.
Fig. 5
Witnesses
A. M. Dorr.
C. R. Stickney.
Inventor
William E. Marchant.
By
Attorneys

UNITED STATES PATENT OFFICE.

WILLIAM E. MARCHANT, OF DETROIT, MICHIGAN, ASSIGNOR OF ONE-HALF TO ROBERT H. MARTIN, OF MOUNT CLEMENS, MICHIGAN.

SPEED-LIMITING DEVICE FOR MOTOR-VEHICLES.

994,415.  Specification of Letters Patent.  Patented June 6, 1911.

Application filed August 29, 1910. Serial No. 579,485.

*To all whom it may concern:*

Be it known that I, WILLIAM E. MARCHANT, a citizen of the United States of America, residing at Detroit, in the county of Wayne and State of Michigan, have invented certain new and useful Improvements in Speed-Limiting Devices for Motor-Vehicles, of which the following is a specification, reference being had therein to the accompanying drawings.

This invention relates to a device adapted for use on motor vehicles to fix the limit of speed at which the vehicle may be driven and the invention consists in mechanism adapted to automatically cut off or throttle the supply of the motive agent to the motor of the vehicle whenever the vehicle exceeds the limit of speed to which the mechanism has been set and further consists in a specific construction and arrangement of parts whereby the device cannot be tampered with by unauthorized persons thereby forming a means to compel drivers in charge of motor vehicles to keep within a prescribed limit of speed, all as more fully hereinafter described and shown in the accompanying drawings, in which—

Figure 1:
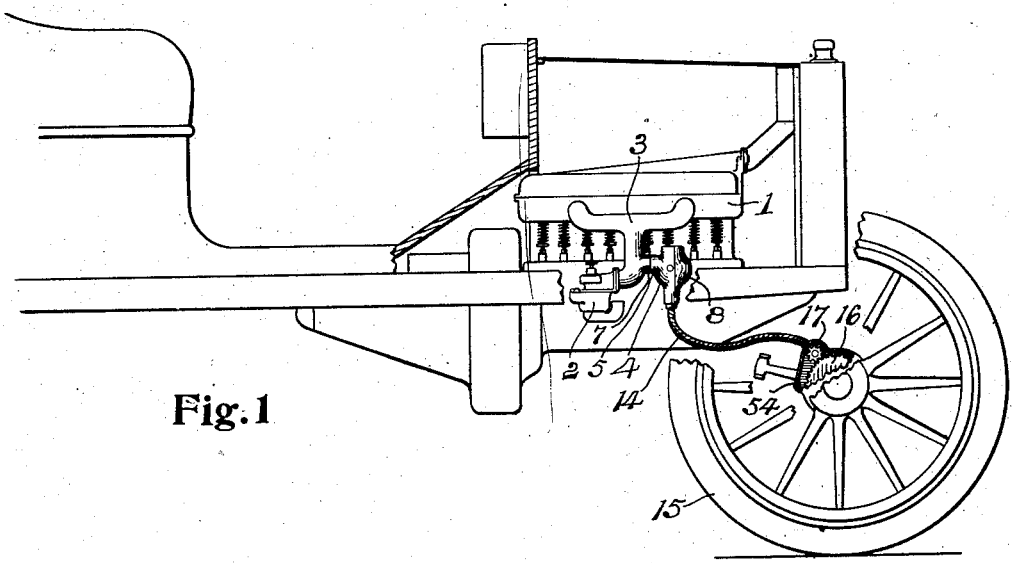
Figure 2:
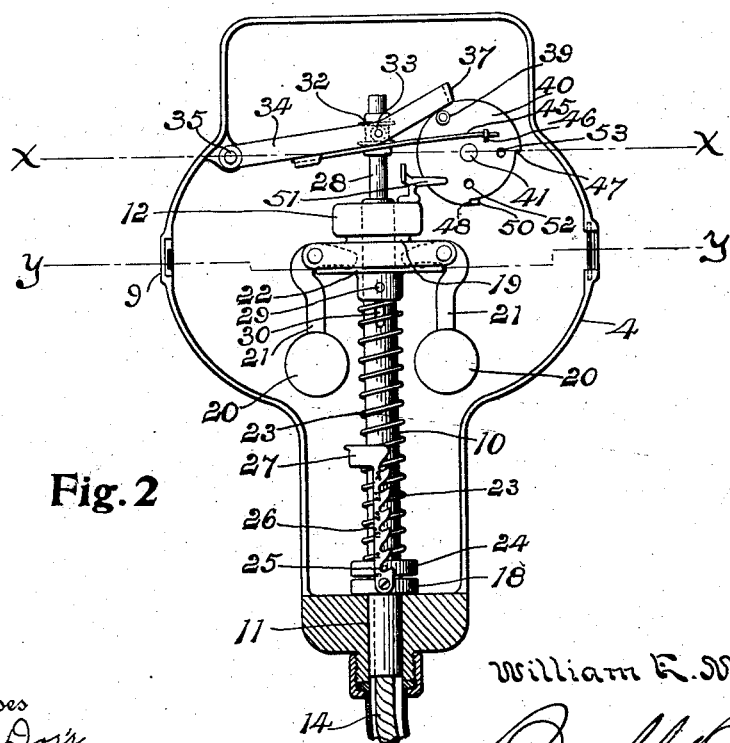

Figure 1 is a side elevation showing my device as applied to an automobile propelled by a motor using gasolene vapor as the motive agent, Fig. 2 is an enlarged vertical central section through the casing containing the governor, Fig. 3 is a cross section on line x—x Fig. 2, Fig. 4 is a cross section on line y—y in Fig. 2 and Fig. 5 is an enlarged sectional plan of the latch hereinafter specifically referred to.

Referring to the drawings, 1 represents the actuating motor of the vehicle, 2 represents a carbureter for generating the gasolene vapor and 3 is the manifold for conducting the vapor to the motor.

My device comprises a tight outer casing 4 which as shown in the drawings is preferably secured directly to the manifold by means of a boss 5 which is secured by bolts 6 to a boss 7 formed on the manifold. This casing is made with a cover 8 hinged or otherwise made to open and has a suitable lock 9 which prevents free access to the inclosed mechanism. This comprises a shaft 10 supported in a bearing 11 in one end of the casing and in a bearing 12 formed on top of a standard 13. The outer end of the shaft 10 is connected to the end of a flexible shaft 14 which extends to one of the front wheels 15 of the vehicle and receives motion therefrom through intermediate gear wheels 16 and 17 in the well known manner of actuating a speedometer. The shaft 10 is provided near its opposite ends with thrust collars 18 and 19 and carries the centrifugal governor weights 20 on the arms of the bell crank levers 21 which are pivotally secured to the thrust collar 19 and bear against a sliding collar 22 sleeved upon the shaft 10.

A coil spring 23 is interposed between the sliding collar 22 and another loose collar 24 which is provided with a pin 25 adapted to engage with the notches of a link 26 pivotally secured to the fixed collar 18 and provided with a finger piece 27 for manual operation.

In the inner end of the shaft 10 is slidingly supported the governor spindle 28 which is secured by a pin 29 which passes through a slot 30 in the shaft 10 to the sliding collar 22 and bears upon its free end the grooved collar 32. A lever 34 which has its pivot at 35 and carries a pin 33 which rides in the groove of the collar 32 is provided at its free end with a downwardly projecting flange 37 adapted to interpose itself in the path of a roller pin 39 carried by a disk 40. The disk 40 is mounted on the upper end of a shaft 41 journaled in a support 42 and projecting into the manifold 3, forming the valve stem of a damper or valve 43.

The lever 34 has secured to it a spring arm 45 the free end of which passes through a slot in a post 46 secured upon the face of the disk. A portion of the edge of the disk is cut away to form two shoulders 47 and 48 coöperating with the fixed stop 50 to limit the movement of the disk and a latch 51 is pivotally secured to the standard 13 and adapted to lock the disk if desired in either one of these positions by engaging it into the holes 52, 53 respectively.

In practice the parts being constructed and arranged as shown and described they are intended to operate as follows:—When the vehicle is at rest the parts are in the position shown in the drawings in which position the valve 43 is being held in this position by the position of the spring arm 45 which holds by a slight tension the shoulder 48 against the stop 50. As soon as the speed of the vehicle overcomes the restraining action of the spring 23 on the governor the governor spindle shifts the lever 34 and causes the flange 37 to move into the path of the roller pin 39 thereby preventing the spring arm 45 from turning the disk. As soon however as the vehicle has reached the limit of speed to which the device is adjusted the flange 37 has crossed the path of the pin 39 and the spring arm 45 being now under considerable tension instantly rotates the disk and closes the valve 43, the valve being held in this position by the shoulder 47 striking the stop 50. This closing of the valve causes the quick slowing down of the motor and consequently of the vehicle and of the governor and the latter will gradually carry the lever 34 back to its normal position thus re-opening the valve and restoring the parts to their normal position.

The successful operation of the device does not require that the valve should cut off the whole flow of the motive agent as enough may be allowed by making the valve of lesser diameter than that of the area of the manifold to keep the vehicle in motion and not produce any sudden shock.

The critical point at which the governor operates depends upon the tension of the coil spring 23 which can be varied by adjusting the pin 25 in the notches of the bar 26. This bar thus forms an index and the notches are suitably marked to indicate the speed at which the governor becomes operative.

The device occupies but little room and by locking it up the driver is held under control and cannot exceed the speed limit to which it has been set. As a further protection a lock up casing 54 may also be used to inclose the drive connection with the wheel.

If it should be desired to prevent the operation of the valve it can be locked either in its open or closed position by engaging the latch 51 into the holes 52 or 53 respectively, the latch being held in its various positions by a friction lock.

What I claim as my invention is:—
1. The combination with an element adapted to cut off the supply of the motive agent to the motor of the vehicle the speed of which is to be limited, of a centrifugal device actuated by the movement of the vehicle, a spring restraining said device against centrifugal action up to a predetermined speed limit, a lever, actuating connection for positively oscillating said lever by the centrifugal action of the governor, a yielding connection between the lever and the cut-off element for moving the same in and out of operative position by the movement of the lever and stops carried by the lever and cut off element in paths intersecting each other and adapted to engage with each other and hold the cut-off element in position till the predetermined speed limit is reached.

2. The combination with an element adapted to cut off the supply of the motive agent to the motor of the vehicle, the speed of which is to be limited, of a centrifugal governor actuated by the movement of the vehicle, a spring restraining it against centrifugal action up to a predetermined speed limit, means for adjusting the tension of the spring for different speed limits, a reciprocatingly actuated governor spindle, a lever actuated by said spindle, a yielding connection between said lever and the cut off element adapted to actuate the same in and out of operative position, and stops carried by the cut off element and by the aforesaid lever in intersecting paths and adapted to hold the cut off element in its open position till the predetermined speed limit has been reached.

3. The combination with an element adapted to cut off the supply of the motive agent to the motor of the vehicle, the speed of which is to be limited, of a centrifugal governor actuated by the movement of the vehicle, a spring restraining it against centrifugal action up to a predetermined speed limit, a reciprocatingly actuated governor spindle, a lever actuated by said spindle, yielding actuating connection between said lever and the cut off element, and stops carried by the lever and by the cut-off element respectively in paths intersecting each other and normally out of engagement with each other, said stops adapted to engage with each other and hold the cut off element in position till the predetermined speed limit has been reached.

4. The combination with a self propelled vehicle deriving its power from a gas engine, a speed limiting device comprising a damper in the inlet pipe provided with an outwardly projecting stem, a lock casing secured to the inlet pipe and inclosing said stem, a centrifugal device in the casing actuated by the movement of the vehicle, a spring restraining the action of said device up to a predetermined speed, a lever having connection with the governor to be positively actuated by the same by the centrifugal action of the governor, a yielding connection between the lever and the stem of the damper to actuate the same by the movement of the lever and stops carried by said lever and the stem of the damper adapted to coöperate with each other in the movement of the lever to hold the damper in its open position till the predetermined speed limit is reached.

5. The combination with a self propelled vehicle deriving its power from a gas engine supplied through a manifold, a speed limiting device comprising a damper in the manifold, a lock-up casing secured to the manifold and inclosing the stem of the damper, a shaft journaled in said casing, driving connection between said shaft and one of the wheels of the vehicle, a centrifugal governor upon said shaft, a spring upon the shaft restraining said governor against centrifugal action up to a predetermined speed, a lever having actuating connection with said governor for positively oscillating the same by the centrifugal action of the governor, a resilient arm on the lever adapted to open and close the damper by the movement of the lever, stops carried by the lever and the stem of the damper adapted to coöperate and hold the damper open till the predetermined speed limit has been reached.

6. In a speed limiting device for a self-propelled vehicle operated by a gas engine, the combination with a manifold adapted to supply the engine with the motive fluid, a damper in said manifold having an outwardly projecting stem, a lock-up casing secured to the manifold and inclosing said stem, and a controlling device for said damper inclosed within said casing and comprising a shaft journaled in said casing, and adapted to be driven by the motion of the vehicle, a centrifugal governor upon said shaft having actuating connection with the stem of the damper to open and close the same by its centrifugal action, a sliding collar upon the shaft, a restraining spring for the governor interposed between said collar and the governor, a fixed collar upon the shaft and a link pivotally secured to the fixed collar and provided with a series of notches for adjusting the sliding collar in relation thereto, the sliding collar being provided with a pin adapted to engage with said notches.

In testimony whereof I affix my signature in presence of two witnesses.

WILLIAM E. MARCHANT.

Witnesses:
C. R. STICKNEY,
A. M. DORR.

---

Copies of this patent may be obtained for five cents each, by addressing the "Commissioner of Patents, Washington, D. C."